(12) United States Patent
Vieillard et al.

(10) Patent No.: US 9,592,907 B2
(45) Date of Patent: Mar. 14, 2017

(54) DEVICE FOR ELECTRICALLY POWERING AN AIRCRAFT ON THE GROUND

(75) Inventors: Sebastien Vieillard, La Chapelle Gauthier (FR); Serge Berenger, Chevilly Larue (FR); Serge Thierry Roques, Cornebarrieu (FR); Pascal Dauriac, Rontignon (FR)

(73) Assignees: LABINAL POWER SYSTEMS, Blagnac (FR); TURBOMECA, Bordes (FR)

( * ) Notice: Subject to any disclaimer, the term of this patent is extended or adjusted under 35 U.S.C. 154(b) by 237 days.

(21) Appl. No.: 14/234,541

(22) PCT Filed: Jul. 27, 2012

(86) PCT No.: PCT/FR2012/051790
§ 371 (c)(1),
(2), (4) Date: Jan. 23, 2014

(87) PCT Pub. No.: WO2013/017789
PCT Pub. Date: Feb. 7, 2013

(65) Prior Publication Data
US 2014/0138479 A1 May 22, 2014

(30) Foreign Application Priority Data
Aug. 4, 2011 (FR) .................... 11 57169

(51) Int. Cl.
B64D 41/00 (2006.01)
B64C 25/40 (2006.01)
H02J 4/00 (2006.01)

(52) U.S. Cl.
CPC ............ *B64C 25/405* (2013.01); *B64D 41/00* (2013.01); *H02J 4/00* (2013.01); *Y02T 50/44* (2013.01); *Y02T 50/823* (2013.01)

(58) Field of Classification Search
CPC ...... B64C 25/405; B64D 41/00; Y02T 50/823
(Continued)

(56) References Cited

U.S. PATENT DOCUMENTS

| 5,899,411 | A | * | 5/1999 | Latos | ..................... | B64D 33/00 244/53 A |
| 7,207,521 | B2 | * | 4/2007 | Atkey | ..................... | B64D 13/06 244/58 |

(Continued)

FOREIGN PATENT DOCUMENTS

| EP | 1 897 804 | 3/2008 |
| EP | 2 236 419 | 10/2010 |

(Continued)

OTHER PUBLICATIONS

International Search Report issued Jul. 11, 2013 in PCT/FR12/051790 filed Jul. 27, 2012.
U.S. Appl. No. 14/385,622, filed Sep. 16, 2014, Vieillard et al.

*Primary Examiner* — Brian M O'Hara
*Assistant Examiner* — Keith L Dixon
(74) *Attorney, Agent, or Firm* — Oblon, McClelland, Maier & Neustadt, L.L.P.

(57) ABSTRACT

An electrical power supply device for an aircraft on the ground, the device including two electricity generators driven by an auxiliary power unit, wherein the first generator is connected by a selective connection/disconnection mechanism to an aircraft network and to an electrical taxiing network, and is configured to deliver either a first AC voltage to the aircraft network when it is connected to that network, or an AC voltage or a power to the taxiing network when it is connected to that network, and wherein the second generator is connected by the connection/disconnection mechanism to the aircraft network to deliver the first AC (Continued)

voltage to that network solely when the first generator is powering the taxiing network.

11 Claims, 3 Drawing Sheets

(58) Field of Classification Search
  USPC ............................................. 244/58
  See application file for complete search history.

(56) References Cited

U.S. PATENT DOCUMENTS

| | | | | |
|---|---|---|---|---|
| 7,445,178 B2 * | 11/2008 | McCoskey | ............... | B64F 1/32 244/100 R |
| 7,975,960 B2 * | 7/2011 | Cox | ............... | B64C 25/36 244/103 R |
| 8,136,756 B2 * | 3/2012 | Duces | ............... | H02J 3/02 244/58 |
| 8,403,259 B2 * | 3/2013 | Charuel | ............... | B64C 25/405 244/103 S |
| 8,474,749 B2 * | 7/2013 | Cros | ............... | B64C 25/405 244/100 R |
| 9,242,726 B2 * | 1/2016 | Garcia | ............... | B64C 25/405 |
| 2006/0061213 A1 * | 3/2006 | Michalko | ............... | H02J 4/00 307/9.1 |
| 2009/0118874 A1 | 5/2009 | White et al. | | |
| 2010/0252675 A1 | 10/2010 | Malkin et al. | | |
| 2012/0161676 A1 | 6/2012 | White et al. | | |
| 2012/0292437 A1 * | 11/2012 | Garcia | ............... | B64C 25/405 244/58 |
| 2013/0048781 A1 | 2/2013 | Berenger et al. | | |

FOREIGN PATENT DOCUMENTS

| | | |
|---|---|---|
| FR | 2 954 283 | 6/2011 |
| WO | 2009/125007 | 10/2009 |

\* cited by examiner

DEVICE FOR ELECTRICALLY POWERING AN AIRCRAFT ON THE GROUND

BACKGROUND OF THE INVENTION

Field of the Invention

The present invention relates to a device for electrically powering an aircraft on the ground, the device comprising at least two electricity networks: an aircraft electricity network, in particular for powering the cabin and the cockpit of the aircraft; and an electrical taxiing network.

DESCRIPTION OF THE RELATED ART

Applications FR 10/55457 and FR 10/59612 in the name of the Applicant describe respectively a device for powering the electricity network of an aircraft, and an electrical configuration for processing the energy that is regenerated by electrical actuators during taxiing operations of an aircraft.

An aircraft is said to be "taxiing when it is traveling or running on the ground using the wheels of the aircraft landing gear. Taxiing is said to be "electrical" when the wheels of at least one undercarriage of the aircraft (and in general the wheels of the main landing gear) are driven by electric motors, which form part of the taxiing network.

The aircraft and taxiing networks are powered by at least one generator driven by an auxiliary power unit (APU).

In the prior art, the APU is started by means of an independent starter powered by a battery, and it has an outlet shaft for driving the above-specified generator.

Several electrical configurations have been proposed for powering aircraft and taxiing networks by using energy delivered by the APU.

A first prior art electrical configuration has two electricity generators driven by the APU. The first generator delivers an AC voltage Vac1 (230 volts (V)) to the taxiing network, and the second generator delivers an AC current (AC) voltage Vac2 (115 V) to the aircraft network. The taxiing network includes an electronic motor control unit (MCU) for controlling the electric motors driving the wheels of the aircraft, which unit is connected to the first generator by connection/disconnection means.

The advantage of that configuration is that the taxiing and aircraft networks are independent of each other and they are powered by generators that are distinct. As a result, constraints concerning validation for certification of the aircraft network (of the ATA 24 type) have no effect on the taxiing network, which may therefore have a simplified electronic control unit, thereby reducing the weight of that unit (by about 50 kilograms (kg)).

Nevertheless, both of the above-mentioned generators have relatively high electrical powers, respectively 120 kilovolt amps (kVA) and 90 kVA, in addition to the electrical power of the starter of the APU. A relatively large amount of electrical power is thus installed on board the aircraft. As a result of their high electrical power levels, the generators are heavy and bulky, and it can be difficult or even impossible to mount them on the outlet shaft of the APU.

In a second electrical configuration of the prior art, the aircraft and taxiing networks are powered by a common high-power generator (150 kVA), which is driven by the APU. That generator delivers an AC voltage Vac2 (115 V) to the aircraft and taxiing networks, which are connected to the generator by connection/disconnection means. The taxiing network and has an electronic power unit connected to the electric motors for driving the wheels of the aircraft.

The drawback of that electrical configuration is that the taxiing network must comply with all of the network standards (e.g. of the ATA 24 type) that are applicable to the aircraft, and it is powered by the voltage Vac2 at 115 V. The electronic power unit of the taxiing network includes an energy conversion function serving to increase the voltage level without polluting the aircraft network. In general, this function is performed by an auto transformer rectifier unit (ATRU), thereby leading to a significant increase in the weight of this unit (by about 50 kg to 100 kg).

Proposals have also been made, in another prior art electrical configuration, to power the taxiing network of an aircraft by means of at least one generator driven by an engine of the aircraft, the aircraft electrical network being powered by another generator driven by an APU. Nevertheless, that configuration makes it necessary to run an engine, thereby leading to significantly smaller savings in fuel consumption to be expected from the aircraft having an electrical taxiing function.

BRIEF SUMMARY OF THE INVENTION

A particular object of the invention is to reduce or eliminate in a manner that is simple, effective, and inexpensive, at least some of the above-mentioned drawbacks of the prior art by means of a novel electrical configuration for electrically taxiing an aircraft.

To this end, the invention provides an electrical power supply device for an aircraft on the ground, the device comprising two electricity generators driven by an auxiliary power unit, the first generator being for powering an electrical taxiing network including electric motors for driving wheels of the aircraft, and the second generator being for powering an aircraft electricity network, the power supply device being characterized in that the first generator is connected by selective connection/disconnection means to the aircraft and taxiing networks, for delivering a first AC voltage Vac2 to the aircraft network when it is connected to that network, or a higher AC voltage Vac1 or a power P to the taxiing network when it is connected to that network, and in that the second generator is connected by connection/disconnection means to the aircraft network in order to deliver said AC voltage Vac2 to that network solely when the first generator is powering the electrical taxiing network.

In the device of the invention, the first generator driven by the auxiliary power unit is used to power the taxiing network when the aircraft needs to taxi on the ground, and to power the aircraft network when the taxiing network is not being powered. This first generator is said to be "hybrid", and it is capable of delivering selectively a voltage Vac1 for powering the taxiing network or a voltage Vac2 for powering the aircraft network. In a variant, the first generator may be capable of delivering selectively a power P for powering the taxiing network, or a voltage Vac2 for powering the aircraft network. The second generator is used for powering the aircraft network while the first generator is powering the electrical taxiing network. The second generator is advantageously dimensioned to be capable of supplying only the needs of the aircraft on the ground, thus making it possible to reduce the on-board electrical power and thus the volume that is installed in the aircraft. The connection/disconnection means are controlled, during taxiing, to connect the first generator to the taxiing network (in order to power it with a voltage Vac1 or with a power P) and the second generator to the aircraft network (in order to power it with a voltage Vac2), and during other stages of the operation of the aircraft, to connect the first generator to the aircraft network in order to power it with a voltage Vac2, the second generator then being stopped.

The invention thus makes it possible both to design the taxiing network without complying with the constraints imposed by the standards (of the ATA 24 type) applicable to the network specific to the aircraft, and also to reduce the harmonic pollution constraints associated with the taxiing function.

According to another characteristic of the invention, one of the two generators is a starter/generator suitable for starting the auxiliary power unit, and it can thus replace the independent starter used in the prior art, thereby constituting a significant saving in weight. Furthermore, this starter/generator is mounted on the APU in the place of the starter (i.e. on the group gearwheel generally dedicated to the starter in the prior art) and it therefore does not impede mounting the other generator on the outlet shaft of the APU.

The device of the invention also includes an electronic power unit that is connected to the starter/generator for controlling the starting of the auxiliary power unit. This unit may comprise control means of the generator control unit (GCU) type for regulating the current or the voltage delivered by the starter/generator and for protecting it in the event of electrical overload.

The first generator is preferably a three-stage synchronous generator with wound rotor excitation. Varying rotor excitation makes it possible either to vary the output voltage from the generator between the values Vac1 and Vac2, or else to switch between a voltage generator (delivering an AC voltage Vac2 that is substantially constant) and a current or power generator delivering a substantially constant current or power as a function of the needs for taxiing, e.g. a power of 150 kilowatts (kW).

The first generator may deliver a voltage of 115 Vac (Vac2) at a power of 90 kVA when it is connected to the aircraft network or a voltage of 230 Vac (Vac1) and a power of 150 kW (for a generator that is regulated in voltage or in power) when it is connected to the taxiing network.

The second generator may deliver electrical power lying in the range 30 kVA to 40 kVA, and a voltage Vac1 of 115 V at 400 hertz (Hz). The electrical power on-board the aircraft for operation on the ground is thus much less than that used in the prior art as described above (120 kVA 130 kVA, as compared with 210 kVA in the prior art). Furthermore, because of its low electrical power, the second generator is compact and can be driven together with the first generator by the outlet shaft of the APU.

The present invention also relates to a method of electrically powering an aircraft on the ground by means of a device as described above, the method being characterized in that it comprises a step consisting in powering the taxiing network by the first generator and the aircraft network by means of the second generator, and a step consisting in powering the aircraft network by means of the first generator when the taxiing function is not in use, the second generator then not being used.

Advantageously, the first generator is a three-stage synchronous generator with wound rotor excitation, and the excitation of this generator is controlled by an electronic power unit for switching between a generator of the voltage Vac1 to a generator of the voltage Vac2 or from a generator of a power P to a generator of the voltage Vac2.

BRIEF DESCRIPTION OF THE SEVERAL VIEWS OF THE DRAWINGS

The invention can be better understood and other characteristics, details and advantages thereof appear more clearly on reading the following description made by way of nonlimiting example and with reference to the accompanying drawings, in which.

DETAILED DESCRIPTION OF THE INVENTION

Figure 1:
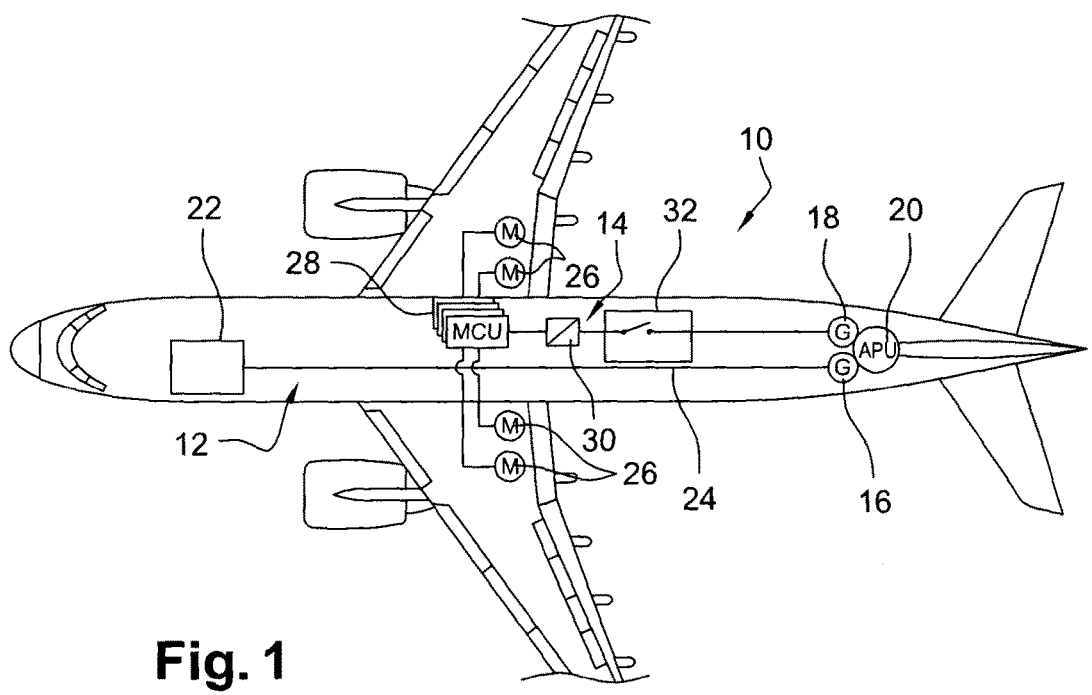
FIGS. 1 and 2 are both diagrammatic views of respective prior art electrical power supply devices for aircraft.

Reference is made initially to FIG. 1, which shows an aircraft having a prior art device 10 for feeding electricity both to an aircraft network 12, in particular for powering equipment in the cockpit and the passenger cabin of the aircraft, and also for powering an electrical taxiing network 14.

Each network 12, 14 is powered by a respective electricity generator 16, 18 driven by an auxiliary power unit 20, referred to below by the acronym APU.

The APU 20 is situated at the rear of the aircraft fuselage and has an outlet shaft (not shown) for driving the rotors of the generators 16, 18. The APU 20 is fitted with an independent starter (not shown), which is connected to a battery and to means for controlling the starting of the APU.

The generator 16 has electrical power of 90 kVA and it delivers an AC voltage Vac2 at 115 V to the network 12, which network is shown diagrammatically in FIG. 1 as a primary distribution unit 22 connected by an electrical harness 24 to the generator 16.

The generator 18 has electrical power of 120 kVA and delivers an AC voltage Vac1 of 230 V to the taxiing network 14, which is represented diagrammatically by four motors (M) 26, connected to an electronic motor control unit (MCU) 28, which is itself connected by a rectifier 30 to the generator 18. The output from the generator 18 is connected to the taxiing network 14 by connection/disconnection means 32 that serve to isolate the generator from the taxiing network 14 when the taxiing function is not desired, e.g. while the aircraft is in flight.

This electrical configuration presents the drawbacks described above, which are due mainly to the relatively high electrical powers of the generators 16, 18 (respectively 90 kVA and 120 kVA), to their weight, and to the space that they occupy.

Figure 2:
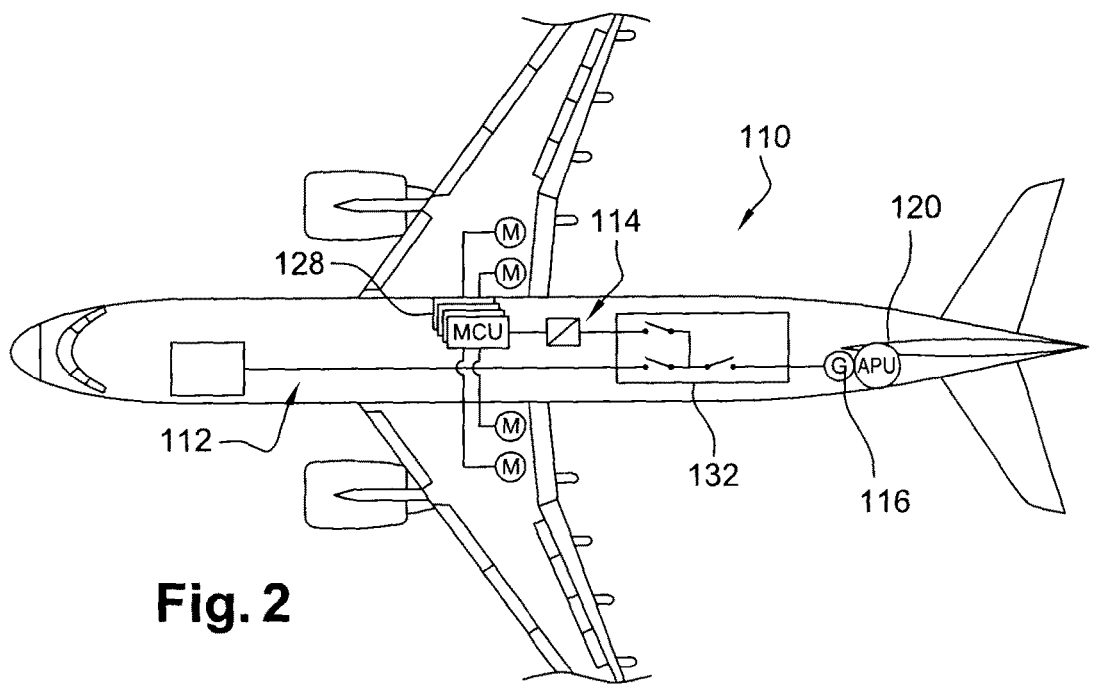

FIG. 2 shows an aircraft fitted with another prior art device 110 for electrically powering the aircraft network 112 and the taxiing network 114.

The networks 112, 114 are powered by a common electricity generator 116 that is driven by an APU 120.

The output from the generator 116 is connected to the networks 112, 114 by connection/disconnection means 132 and it delivers an AC voltage Vac2 at 115 V to these networks.

The electronic power unit (MCU) 128 of the taxiing network 114 includes an auto transformer rectifier unit (ATRU) module for converting energy, which module serves to increase the voltage level delivered by the generator 116.

This other electrical configuration also presents drawbacks, which are due mainly to the fact that the ATRU module gives rise to a significant increase in the weight of the electronic power unit (MCU) 128, and that the taxiing network 114 needs to comply with all of the certification standards applicable to the network 112 of the aircraft 12 (of the ATA 24 type).

The invention makes it possible to remedy at least some of the drawbacks of the prior art by powering the taxiing network and the network specific to the aircraft by means of two generators, one of which is "hybrid" and is capable of powering either network in selective manner.

Figure 3:
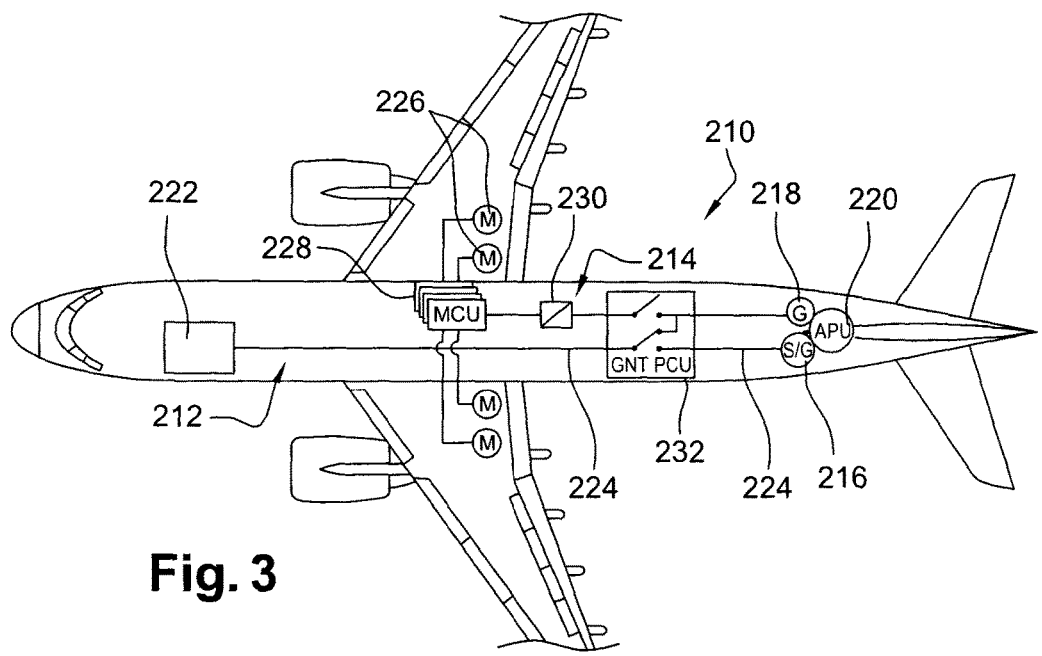
FIG. 3 is a diagrammatic view of an electrical power supply device of the present invention for an aircraft.

FIG. 3 shows a preferred embodiment of the device 210 of the invention, in which an APU 220 situated at the rear of the fuselage of an aircraft drives the rotors of two independent electricity generators 216, 218.

The output from the generator 216 is connected by connection/disconnection means 232 to the input of a primary distribution unit 222 of the aircraft network, with the output(s) of the unit 222 being connected for example to equipment in the cockpit and to various compartments of the aircraft fuselage. The electrical connections between the unit 222, the means 232, and the generator 216 are established by electrical harnesses 224.

The generator 216 has electrical power lying in the range 30 kVA to 40 kVA and it delivers an AC voltage Vac2 to the aircraft network 212, e.g. at 115 V and 400 Hz.

The output from the generator 218 is connected by connection/disconnection means 232 to the input of a rectifier 230 of the taxiing network, the output from the rectifier 230 being connected to the input of an electronic power unit (MCU) 228 which powers the motors 226 for driving the wheels of the main landing gear of the aircraft. There may be four of these motors 226.

In the example shown, the means 232 for connecting/disconnecting the generators 216, 218 to the networks 212, 214 are formed by a common green taxiing power control unit (GNTPCU) having contactors or the like that are suitable for establishing electrical connections between the generator 218 and the taxiing network 214, between the generator 218 and the aircraft network 212, and between the generator 216 and the aircraft network 212. The GNTPCU serves to manage the electrical configurations of the aircraft by means of contactors and it further includes at least one generator control unit (GCU) type card for controlling the excitation of the generator 218, as described below.

The generator 218 has electrical power of about 90 kVA, for example, and it is suitable for powering the taxiing network 214 and the aircraft network 212.

When the taxiing function is not in use, the output from the generator 218 is connected by the means 232 to the aircraft network 212 and it delivers an AC voltage Vac2 to this network, e.g. 115 V at 400 Hz. The output from the generator 218 is disconnected from the taxiing network 214 by the means 232. The output from the generator 216 may also be disconnected from the network 212 by the means 232. The contactors of the GNTPCU are then in the positions as shown in FIG. 3.

Figure 3A:
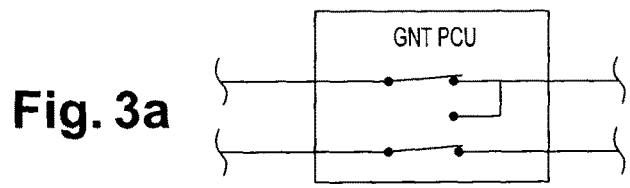

When the taxiing function needs to be used, the output from the generator 216 is connected by the means 232 to the aircraft network 212 and it delivers an AC voltage Vac2 to this network, e.g. 115 V at 400 Hz. The output from the generator 218 is connected by the means 232 to the taxiing network 214 and it delivers an AC voltage Vac1 to this network, e.g. 230 V at 400 Hz, or a power P, which may for example be 150 kW at 230 V. The contactors of the GNTPCU are then in the positions as shown in FIG. 3a.

The rectifier 230 is of the AC/DC type and it serves to convert the AC voltage Vac1 into a DC voltage Vdc1. The MCU 228 may have contactors or at least one energy converter, each including one or more inverters. Advantageously, the inverters operate merely in electricity-switching mode when the generator 218 is delivering electricity or power to the taxiing network 214.

The generator 216 is preferably a starter/generator (S/G), which is capable of being used in "motor" mode when energy is applied thereto for the purpose of starting the APU 220. This makes it possible to omit the starter that used to be dedicated to starting the APU in the prior art. The low-power generator 216 is mounted on the APU 220 instead of the original starter, which makes it possible to avoid hindering installing the generator 218 on the outlet shaft of the APU 220.

In a variant, it is a generator 218 that is used for starting the APU 220. The generator 218, which is suitable for selectively delivering two voltages Vac1 and Vac2, or a voltage Vac2 and a power P, is advantageously a three-stage synchronous generator with wound rotor excitation, and its principle of operation is shown diagrammatically in FIG. 4.

The generator 218 comprises a wound main rotor 250 driven by the outlet shaft 248 of the APU inside a wound main stator 252. The generator 218 is of the three-stage type (3 rotor/stator assemblies) and in addition to the assembly comprising the main rotor 250 and the main stator 252, it further comprises a permanent-magnet rotor 254 and stator 256, and a rotor 258 and a stator 260 of an exciter, the permanent-magnet rotors 254, 258 and the exciter being secured to the outlet shaft 248 of the APU.

The output from the rotor 258 of the exciter is connected to the input of a diode rectifier 262, which is secured to the shaft 248, and which has its output connected to the input of the main rotor 250.

The input of the stator 260 of the exciter and the output of the permanent magnet rotor two and 256 are connected to regulation and control means 264 including at least one GCU card that regulates the current or the voltage of the generator 218 and that protects it in the event of electrical overload. These means 264 are also connected to the output of the main stator 252 and they include means for detecting the voltage or the current delivered to the networks 212, 214 of the aircraft. The means 264 may be housed in the GNTPCU.

The generator 218 can thus operate as follows.

The outlet shaft 248 from the APU 220 drives the main rotor 250 of the generator 218 at a predetermined speed. The regulation and control means 264 regulate the power supply to the stator 260 of the exciter so as to generate a magnetic field that induces current in the rotor 258 of the exciter, this current leaving the rotor 258 and being rectified by the rectifier 262 prior to powering the main rotor 250 in order to induce a given voltage or current in the main stator 252 of the third stage of the generator. The permanent-magnet rotor 254 and stator 256 serve in particular to inform the means 264 about the speed of rotation of the shaft 248.

The main rotor 250 induces a current or a voltage in the main stator 252 of the purpose of powering one or the other of the above-mentioned networks 212, 214. The means 264 control the excitation of the generator 218 as a function of the voltage or the current detected at the output from the generator, in such a manner that the generator delivers a defined voltage (Vac1 or Vac2) that is substantially constant, or possibly varying, in order to power in particular the taxiing network, and that can be thought of as a voltage generator, or delivers a substantially constant current or power, and that can be thought of as a current/power generator in particular for powering the taxiing network.

The variation in the excitation of the generator 218 makes it possible to change from a mode of regulating the voltage Vac2 (for powering the network 212 with Vac2, e.g. 115 V) to a mode of regulating power P (for powering the network 214 with power P, for example 150 kW), or from a mode of regulating voltage Vac2 (for powering the network 212 with Vac2, e.g. 115 V) to a mode of regulating the voltage Vac1 (for powering the network 214 with the voltage Vac1, e.g. at 230 V).

The generator 218 preferably delivers a voltage of 115 Vac and a power of 90 kVA when it is connected to the aircraft network, and a power of 150 kW when it is connected to the taxiing network.

Figure 5:
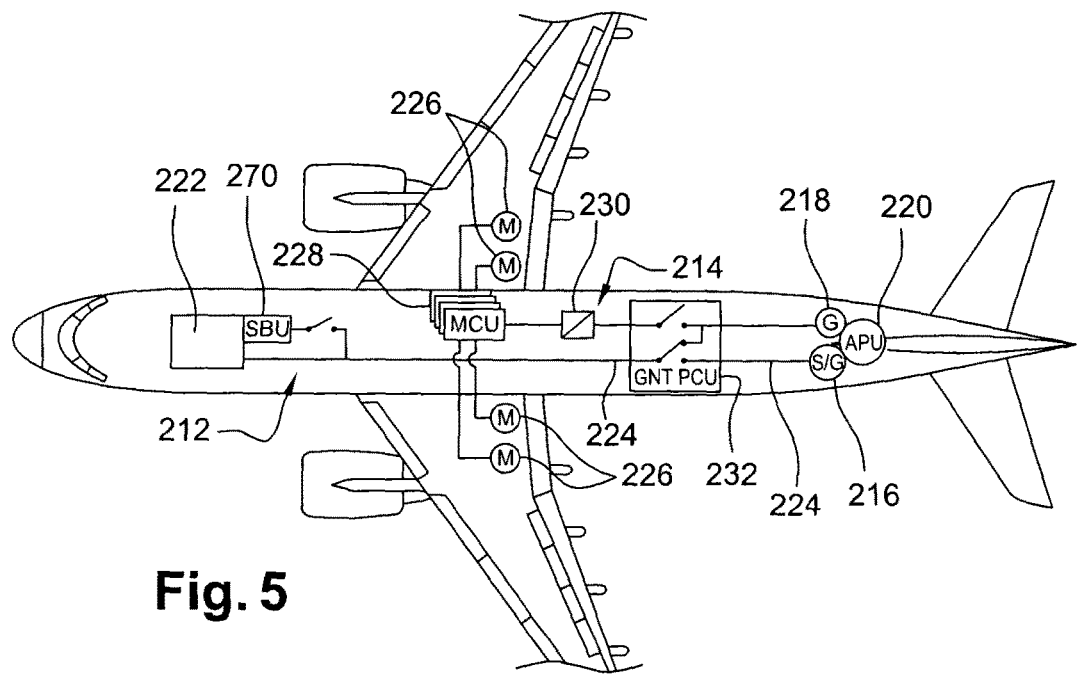
FIGS. 5 and 6 are diagrammatic views of embodiment variants of the power supply device of the invention.

In the variant embodiment of FIG. 5, and electronic power unit 270 of the starter box unit (SBU) type is connected to the harness 224, in parallel with the unit 222. This unit 270 is used for controlling starting of the APU 220 via the starter/generator 216 or 218. Under such circumstances, the way in which the contactors of the GNTPCU (means 232) are controlled may be adapted accordingly.

Figure 4:
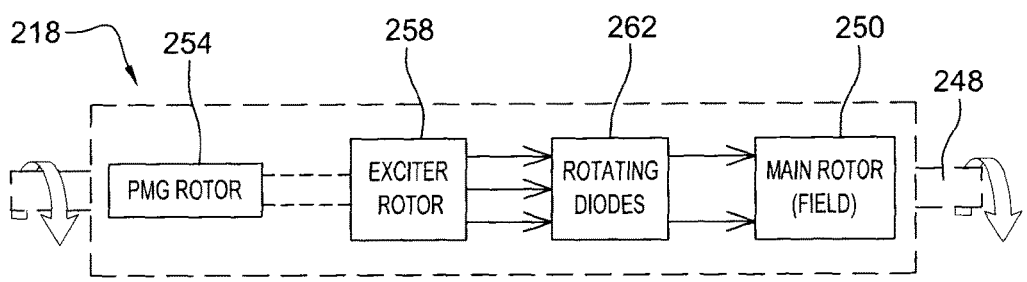
FIG. 4 is a diagrammatic view of a three-stage synchronous generator with wound rotor excitation of the invention.
Figure 4:
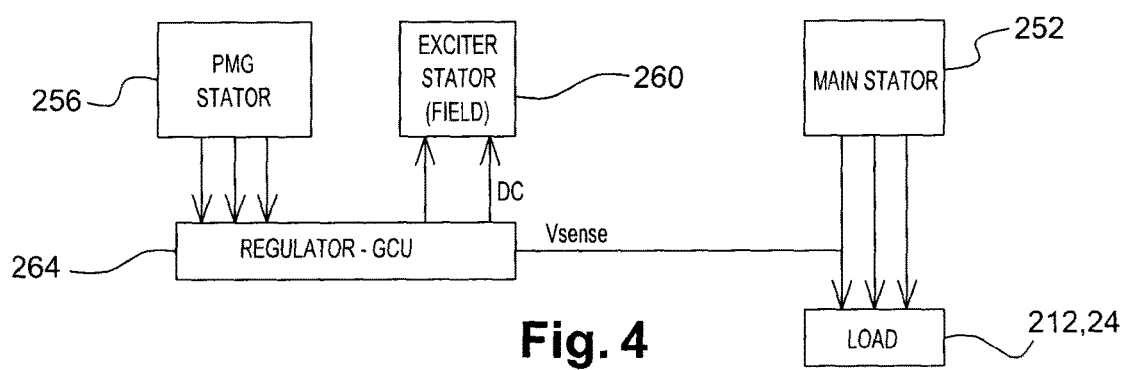
Figure 6:
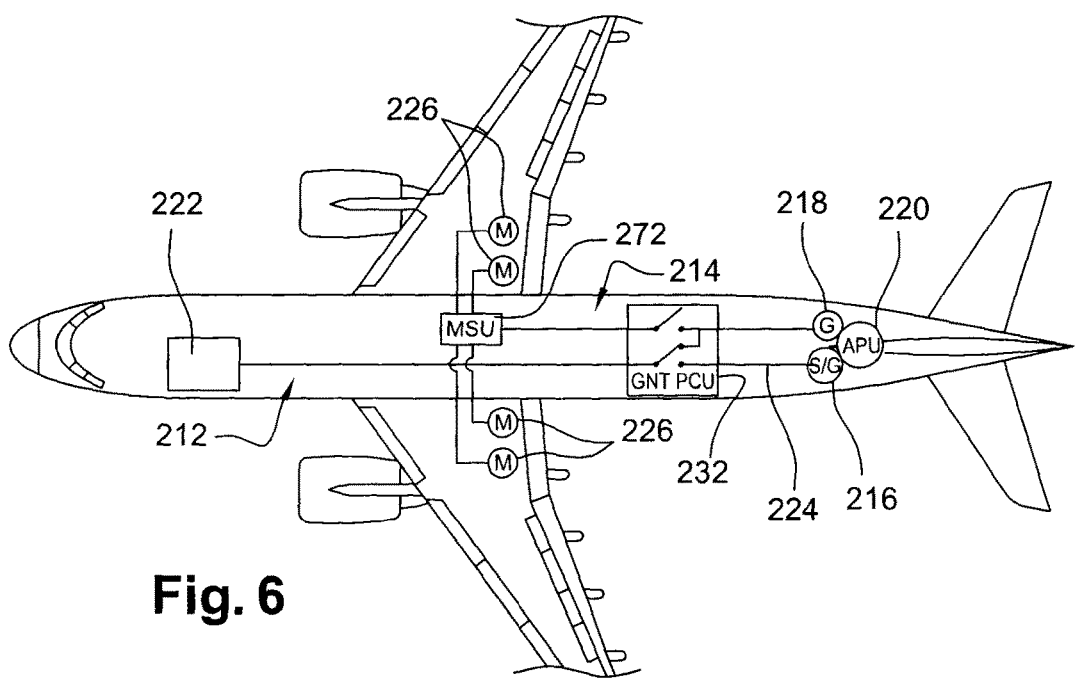

The variant embodiment of FIG. 6 differs from that of FIG. 4 in that the MCU is a replaced by a motor starter control unit (MSCU) or a motor starter unit (MSU) 272. The MSU 272 incorporates some of the power electronics of the GNTPCU in order to control starting of the APU 220 by means of the starter/generator 216 or 218.

The electrical system for starting the APU that is used in the present invention may be of the type described in application WO-A2-2010/079308 in the name of the Applicant.

In yet another variant (not shown), the taxiing network has a number of motors (M) 226 that is not equal to four, and that is equal to two, for example.

The invention claimed is:

1. An electrical power supply device of an aircraft disposed on a ground, the device comprising:
    first and second electricity generators driven by an auxiliary power unit,
    the first electric generator powers an electrical taxiing network including electric motors for driving wheels of the aircraft,
    the second electricity generator powers an aircraft electricity network,
    wherein the first electricity generator is connected by selective connection and disconnection means to the aircraft electricity network and the electrical taxiing network,
    wherein the first electricity generator delivers a first AC voltage to the aircraft electricity network when connected to the aircraft electricity network, and delivers one of a higher AC voltage and an electrical power to the electrical taxiing network when the first electricity generator is connected to the electrical taxiing network, and
    wherein the second electricity generator is connected by the connection and disconnection means to the aircraft electric network to deliver the first AC voltage to the aircraft electricity network only when the first electric generator is powering the electrical taxiing network, and is disconnected by the connection and disconnection means to the aircraft electricity network when the first electricity generator is powering the aircraft electricity network.

2. A device according to claim 1, wherein one of the generators is a starter/generator configured to start the auxiliary power unit.

3. A device according to claim 2, further comprising an electronic power unit connected to the starter/generator for controlling the starting of the auxiliary power unit.

4. A device according to claim 1, wherein the first generator is a three-stage synchronous generator with wound rotor excitation.

5. A device according to claim 1, wherein the first generator delivers a voltage of 115 Vac at 400 Hz and at a power of 90 kVA when it is connected to the aircraft network.

6. A device according to claim 1, wherein the first generator delivers a power of 150 kW when it is connected to the electrical taxiing network.

7. A device according to claim 1, wherein the second generator delivers electrical power in a range of 30 kVA to 40 kVA, and a voltage of 115 Vac at 400 Hz.

8. A method of electrically powering an aircraft disposed on a ground and including an aircraft electricity network, the method comprising:
    a first powering an electrical taxiing network by a first electricity generator, and powering the aircraft electricity network by a second electricity generator; and
    a second powering the aircraft electricity network by the first electricity generator while not powering the electrical taxiing network by the first generator, and not powering the aircraft electricity network by the second electricity generator,
    wherein the first electricity generator delivers a first AC voltage to the electrical taxiing network during the first powering, and delivers a second AC voltage to the aircraft electricity network during the second powering.

9. A method according to claim 8, wherein the first electricity generator is a three-stage synchronous generator with wound rotor excitation, which is excited, the excitation being controlled by an electronic power unit for switching between:
    either an electricity generator configured to deliver the first AC voltage to the electrical taxiing network, or an electricity generator configured to deliver the second AC voltage to the aircraft electricity network, or
    from a generator configured to deliver a predetermined electrical power to the electricity generator configured to deliver the second AC voltage.

10. A device according to claim 1, wherein the electrical taxiing network includes a rectifier which converts AC voltage to DC voltage.

11. A method according to claim 8, wherein the electrical taxiing network includes a rectifier which converts AC voltage to DC voltage.

* * * * *